United States Patent [19]

Nelson

[11] Patent Number: 5,024,210
[45] Date of Patent: * Jun. 18, 1991

[54] WATER HEATER CONSTRUCTION

[75] Inventor: Thomas E. Nelson, Anchorage, Ky.

[73] Assignee: Soltech, Inc., Shelbyville, Ky.

[ * ] Notice: The portion of the term of this patent subsequent to Mar. 27, 2007 has been disclaimed.

[21] Appl. No.: 467,938

[22] Filed: Jan. 22, 1990

Related U.S. Application Data

[60] Continuation of Ser. No. 302,395, Feb. 23, 1989, Pat. No. 4,911,142, which is a division of Ser. No. 162,504, Mar. 1, 1988, Pat. No. 4,958,620, which is a division of Ser. No. 8,564, Jan. 29, 1987, Pat. No. 4,736,509.

[51] Int. Cl.$^5$ .............................................. F24H 1/00
[52] U.S. Cl. .................................... 126/344; 126/361; 126/373; 220/429; 220/445
[58] Field of Search ..................... 126/344, 361, 373; 220/429, 444, 445

[56] References Cited

U.S. PATENT DOCUMENTS 4,890,762 1/1990 Pfeffer ............................ 126/361 X
4,911,142 3/1990 Nelson ............................... 126/344

Primary Examiner—Larry Jones
Attorney, Agent, or Firm—Woodard, Emhardt, Naughton Moriarty & McNett

[57] ABSTRACT

A water heater for containing water surrounded in spaced apart relationship by an outer shell includes a sleeve of insulation material, such as fiberglass, located in the annular space between the inner tank and outer sleeve. The top edge of the insulation sleeve includes an annular cuff which is of a radial thickness greater than the radial thickness of the rest of the insulation sleeve such that the cuff is compressed between the interior wall surface of the outer shell and excterior wall surface of the inner tank. An expanded foam thermal insulation material fills the annular space above the cuff of the insulation mat. A method of making a water heater includes the steps of locating a sleeve of insulation material around the exterior wall surface of the inner tank, folding the top end of the insulation sleeve back over itself to form an annular cuff, and positioning the outer shell concentrically over the inner tank whereupon the annular cuff is compressed between the interior wall surface of the outer shell and exterior wall surface of the inner tank. The annular space above the annular cuff of the sleeve is then filled with an expandable foam insulation material which is allowed to foam in situ.

8 Claims, 3 Drawing Sheets

WATER HEATER CONSTRUCTION

REFERENCE TO RELATED APPLICATIONS

This application is a continuation of U.S. Ser. No. 302,395 filed Feb. 23, 1989, now issued U.S. Pat. No. 4,911,142 which is a divisional of U.S. Ser. No. 162,504, filed Mar. 1, 1988, which is now issued U.S. Pat. No. 4,958,620 which is a divisional of U.S. Ser. No. 008,564, filed Jan. 29, 1987, which is now issued U.S. Pat. No. 4,736,509.

BACKGROUND OF THE INVENTION

The present invention relates to water heater devices and more particularly to a thermally insulated water heater device construction, and a method of manufacturing a thermally insulated water heater device.

Typically, water heaters are formed of an inner water tank with an outer shell located over the inner tank with an annular space therebetween. The space between the inner tank and outer shell is filled with a thermal insulation. For many years fiber glass has been used as the insulation material between the inner tank and outer shell. More recently, a foam such as urethane, has been used as the thermal insulation material in place of fiber glass between the inner tank and outer shell. Typically, a foamable material is injected into the space between the inner tank and outer shell, and is allowed to foam in situ. However, there is a problem in restraining the expanding foam within the annual space and more particularly within a predetermined location or region within the annular space. This is especially important when using foam insulation in a gas-fired type water heater wherein it is extremely undesirable to have flammable foam in proximity to the gas burner of the water heater.

Various proposals have been made to solve this problem.

U.S. Pat. No. 4,372,028 issued on Feb. 8, 1983, shows a water heater having a foam filled closed collar located in the annular space between the inner tank and outer shell at the bottom of the inner tank, and the annular space above the collar filled with expanded foam. The collar functions as a stop to the expanded foam in the annular space thereabove. This patent further shows a method of manufacturing the water heater which includes the steps of forming a flexible, expandable closed elongated bag having a hole therein through which an expandable foam can be injected into the bag. The bag is filled with a foam material which expands the bag to form a collar, and before the foam material has had sufficient time to fully expand, the bag opening is sealed and the bag is circumferentially wrapped around the lower end of the tank with the bag ends overlapping each other. Next, before the foam material in the collar has had sufficient time to expand, the outer shell is positioned over the inner tank and bag. The foam in the bag expands forming a collar which is in compression between the inner tank and outer shell. The annular space above the collar is then filled with expandable foam material.

U.S. Pat. No. 4,447,377 issued on May 8, 1977, shows a gas fired water heater wherein a layer of fiberglass insulation material is wrapped around the bottom portion of the inner water tank around the combustion chamber and a plastic envelope is wrapped around the inner tank above the fiberglass insulation. The envelope is in the form of an elongated thin tube having an inner wall, an outer wall, a bottom wall, two end walls and an open top. When wrapped around the inner tank, the end walls of the envelope abut each other. The outer shell is positioned over the inner tank such that the envelope is in the annular space therebetween. Expandable foam is injected through the open envelope top into the envelope and allowed to expand therein.

U.S. Pat. No. 4,447,399 issued on Oct. 16, 1984, shows a water heater having an inflatable toroidally shaped tube located around the bottom end of the inner tank such that when the toroidal tube is inflated with air, it seals the bottom end of the annular space between the inner tank and outer shell. A foamable material is then injected into the annular space above the toroidal tube to fill the annular space.

SUMMARY OF THE INVENTION

The present invention provides a water heater construction and method of manufacturing the same which provides for easy assembly.

More particularly, the present invention provides a water heater device comprising an inner water tank, an outer shell concentrically located over the inner water tank defining an annular space therebetween, a sleeve of insulation material located in the annular space extending from proximate the bottom end of the water heater construction upwardly longitudinally thereof a predetermined distance less than the entire height of the water heater device such that the terminating top edge of the insulation sleeve is a distance below the top end of the water heater device, an annular cuff of the insulation material located at the terminating top edge of the sleeve having a radial thickness greater than the radial thickness of the rest of the insulation sleeve such that the annular cuff is compressed between the exterior wall surface of the water tank and the interior wall surface of the outer shell, and the annular space above the annular cuff filled with a thermal insulating foam material.

The present invention also provides a method for making a water heater device of the type having an inner tank and an outer shell spaced from and encompassing the inner tank defining an annular space therebetween, comprising the steps of locating a sleeve of thermal insulation material around the exterior wall surface of the inner tank extending from proximate the bottom end of the inner tank and extending upwardly longitudinally thereof a predetermined distance less than the full length of the inner tank, folding the top end of sleeve back over itself to form an annular cuff at the top end of the sleeve, positioning the outer shell concentrically over the inner tank whereby the annular cuff is compressed between the interior wall surface of the outer shell and exterior wall surface of the inner tank, placing an expandable foam thermal insulation material in the annular space above the cuff, and allowing the expandable foam insulation material to foam in situ.

BRIEF DESCRIPTION OF THE DRAWING

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 4:
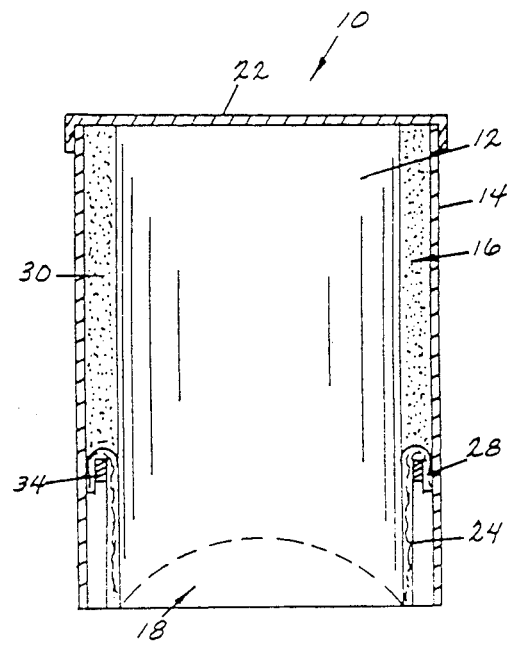
FIG. 4 is a schematic representation, in cross-section, of the novel water heater device of the present invention.

FIG. 4 schematically illustrates a conventional type water heater device, generally denoted as the numeral 10, having an inner water tank 12 for containing water and an outer shell 14 concentrically surrounding the inner water tank 12. The outer shell 14 and inner water tank 12 cooperate to define an annular space 16 therebetween. The annular space 16 is filled with a thermal insulation material to lessen heat loss from the water contained in the inner water tank 12. As shown, the water heater device 10 is of the gas fired type having a combustion chamber 18 located at the bottom end of the inner water tank 12. A combustion device or gas burner (not shown) is located within the combustion chamber 18. The bottom of the annular space 16 can be closed by a bottom wall, and the top of the water heater device 10 is closed by a cover 22.

With continued reference to FIG. 4, a sleeve 24 of insulation mat material is located in the annular space 16. The sleeve 24 is fabricated of a non-flammable material, for example, a fiberglass mat. The sleeve 24 extends from proximate the bottom end of the water heater device 10 upwardly longitudinally thereof a predetermined distance less than the entire height of the water heater device 10 such that the terminating top edge 26 of the insulation sleeve 24 is a distance below the top end of the water heater device 10. Preferably, the sleeve 24 is at least coextensive with the height of the combustion chamber 18 and surrounds the combustion chamber 18 at the bottom region of the annular space 16. The sleeve 24 includes an annular cuff 28 located at the terminating top edge 26. The annular cuff 28 has a radial thickness greater than the radial thickness of the sleeve 24. The annular cuff 28 preferably has a radial thickness greater than the radial width of the annular space 16 such that the annular cuff 28 is radially compressed between the exterior wall surface of the inner water tank 12 and the interior wall surface of the outer shell 14. The annular space 16 above the annular cuff 28 is filled with an expanded foam thermal insulation material 30 such as urethane, polyethylene, polystyrene and the like, which functions as a thermal insulation surrounding the inner water tank 12. Compression of the cuff 28 is important to resist the pressure generated by the expanding foaming material 28 and to prevent leakage past the cuff 28 of the yet liquid foamable material 28 as it is being injected into the annular space 16.

Figure 1:
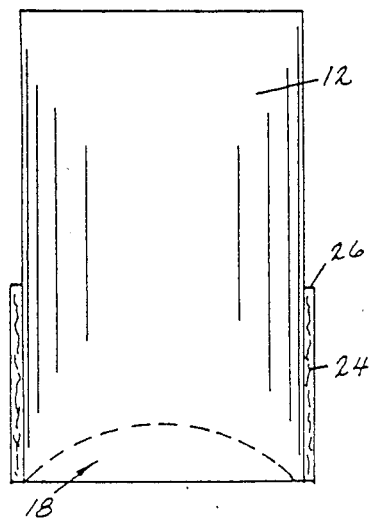
FIG. 1 is a schematic representation, in cross-section, of a step in the novel process of constructing the novel water heater device of the present invention.
Figure 2:
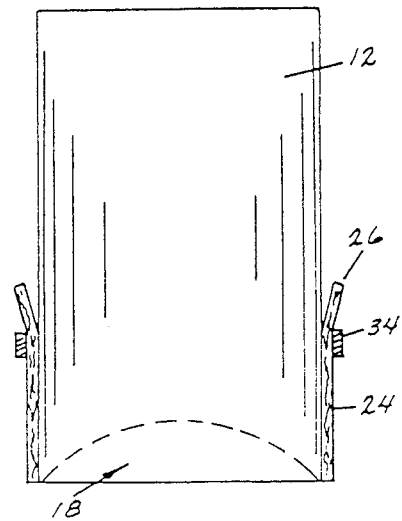
FIG. 2 is a schematic representation, in cross-section, of a second step in the novel process of constructing the novel water heater device of the present invention.
Figure 3:
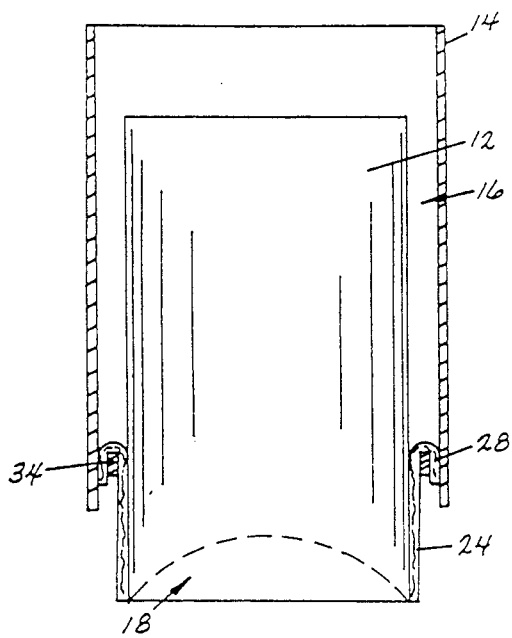
FIG. 3 is a schematic representation, in cross-section, of a third step in the novel process of constructing the novel water heater device of the present invention.

With reference to FIGS. 1 through 4, there is illustrated in schematic format, the sequential steps for making a water heater device 10. Firstly, a sleeve 24 of thermal insulation material mat is located around the exterior wall surface of the inner water tank 12 extending from proximate the bottom end of the inner tank 12 upwardly longitudinally of the inner tank 12 a predetermined distance less than the full length of the inner tank 12 such that the terminating top edge 26 of the sleeve is a predetermined distance below the top end of the inner tank 12. The top end of the sleeve 24 is folded, at least partially, back or displaced in a direction outwardly or away from the inner water tank 12, as can be best visualized by reference to FIG. 2. Next, as can be seen in FIGS. 3 and 4, the outer shell 14 is located over the top end of the inner tank 12 generally coaxially therewith, and is progressively moved coaxially downwardly over the full length of the inner tank 12 until it reaches a position substantially coextensively, concentrically enclosing the inner tank 12. As the outer shell 14 is moved downwardly coaxially over the inner tank 12, the bottom circumferential edge of the outer shell 14 contacts the folded or displaced portion of the terminal top edge 26 of the sleeve 24 and completes the fold by displacing the top edge 26 back over the convex outer surface of the sleeve 24 forming the annular cuff 28 which is radially compressed between the exterior wall surface of the inner tank 12 and interior wall surface of the outer shell 14. Alternatively, the top end of the sleeve 24 can be completely folded back over the convex outer surface of the concentrically over the inner tank 12. Next, expandable foam insulation material is placed in the annular space 16 above the cuff 28 and allowed to expend in situ filling the annular space 16 above the annular cuff 28. The compressed cuff 28 functions as a stop or block to the expanding foam as well as a seal preventing yet liquid foamable material from leaking past the cuff 28.

Figure 5:
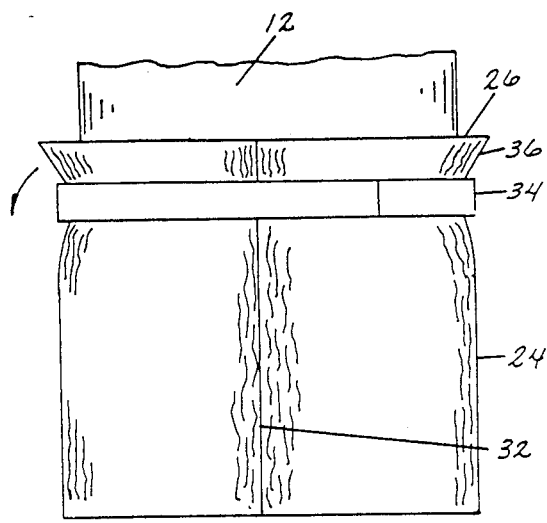
FIG. 5 is a schematic side view of a novel component of the water heater construction of the present invention as it appears as a result of the step of the novel process shown in FIG. 2.
Figure 6:
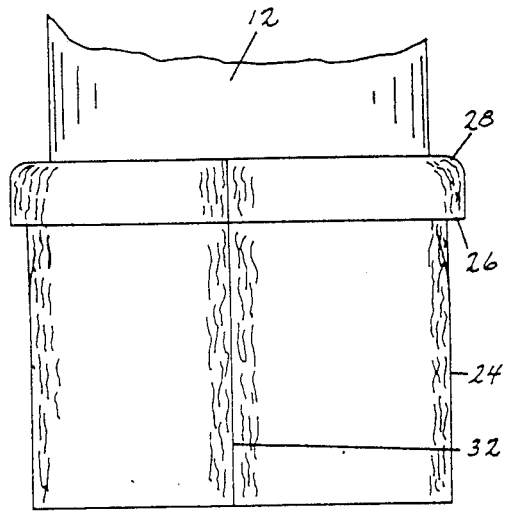
FIG. 6 is a schematic side view of the novel component of FIG. 5 as it appears as a result of the second step of the novel process shown in FIG. 3.

With reference to FIGS. 5 and 6, there is shown one embodiment of the sleeve 24 which comprises a mat of thermal insulation material, such as, for example, fiberglass. The insulation mat is circumferentially wrapped around the exterior wall surface of the inner water tank 12 with the transverse ends 32 of the mat overlapped. Alternatively, it is contemplated that the fiberglass mat can be sized such that the transverse ends 32 thereof will abut instead of overlap, or that the transverse ends 32 can be shaped to provide a smooth overlap. When the sleeve 24 is positioned on the inner water tank 12, a cinch strap 34 is installed circumferentially of the sleeve 24 a distance below the terminating top edge of the sleeve 24 and is tightened to at least slightly compress the sleeve 24 between the cinch strap 34 and inner water tank 12. The ends of the cinch strap 34 can be held together by, for example, a pressure sensitive adhesive. The portion 36 of the sleeve 24 extending above the cinch strap 34 is at least partially folded or displaced in a direction outwardly or away from the tank 12, as can be seen in FIG. 2, sufficiently for the bottom circumferential edge of the outer shell 14 to contact this displaced extending portion 36 and complete the folding thereof back over the convex outer surface of the sleeve 24 as the outer shell 14 is moved downwardly coaxially over the inner tank 12 forming the annular cuff 28. As previously mentioned, the portion 36 of the sleeve 24 can be completely folded back over the convex exterior side of the sleeve 24 prior to installation of the outer shall 14 such that the cuff 28 is formed before the outer shell 14 is fitted over the inner water tank 12. The cinch strap 34 serves three functions. The cinch strap 34 holds the fiberglass mat in encompassing relationship around the inner tank 12, holds the sleeve 24 in position longitudinally of the inner tank 12, and acts as an anchor point or fold line about which the portion 36 of the sleeve 24 extending above the cinch strap 34 can be readily folded to form the annular cuff 28.

Figure 7:
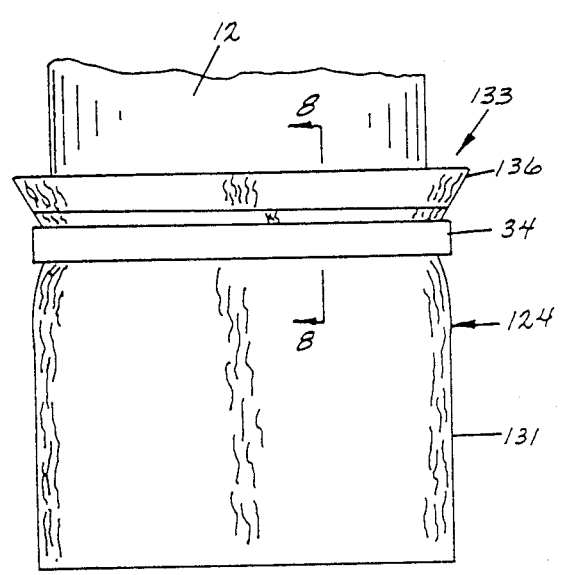
FIG. 7 is a schematic side view of another embodiment of a novel component of the water heater construction of the present invention as it appears as a result of the first step of the novel process shown in FIG. 2.
Figure 8:
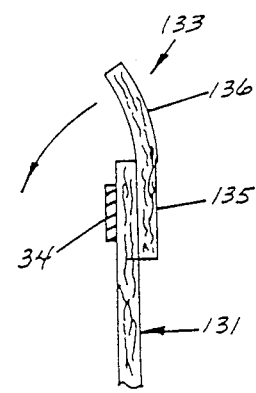
FIG. 8 is a schematic cross-sectional view of a portion of the component of FIG. 7 as seen in the direction of arrows 8—8 in FIG. 7.

FIGS. 7 and 8 illustrate another advantageous embodiment of the sleeve, generally denoted as numeral 124. As shown, the sleeve 124 comprises a first section 131 of fiberglass material which emcompasses the exterior wall surface of the inner tank 12, and a second section 133 of fiberglass material which is located at the top end of the first sections 131 with a circumferential portion 135 in overlapping, relationship to the concave side, or side of the first section 131 which is in circumferential contact with the inner water tank 12, and another circumferential portion 136 extending above the top end of the first section 131. The overlapping portion 135 of the second section 133 is, thusly, sandwiched between the first section 131 and exterior wall surface of the inner tank 12. The overlapping portion 135 of the second section 133 can be adhesivnely attached to the first section 131. The cinch strap 34 encompasses the first section 131 of the sleeve 124 in the area of the overlapping portion 135 of section 133 near the top edge of the first section 131. The extending portion 136 of the second section 133 of the sleeve 124 is at least partially folded over the top edge of the first section 131 or displaced outwardly away from the tank 12 sufficiently for the bottom circumferential edge of the outer shell 14 to contact the displaced extending portion 136, and complete the folding thereof back over the convex outer surface of the first section 131 of the sleeve 124 as the outer shell 14 is moved downwardly coaxially over the inner tank 12 forming the annular cuff 28. Again, alternatively, the extending portion 136 of the second section 133 can be completely folded back over the convex outer surface of the first section 131 of the sleeve 124 prior to the installation of the outer shell 14.

Figure 9:
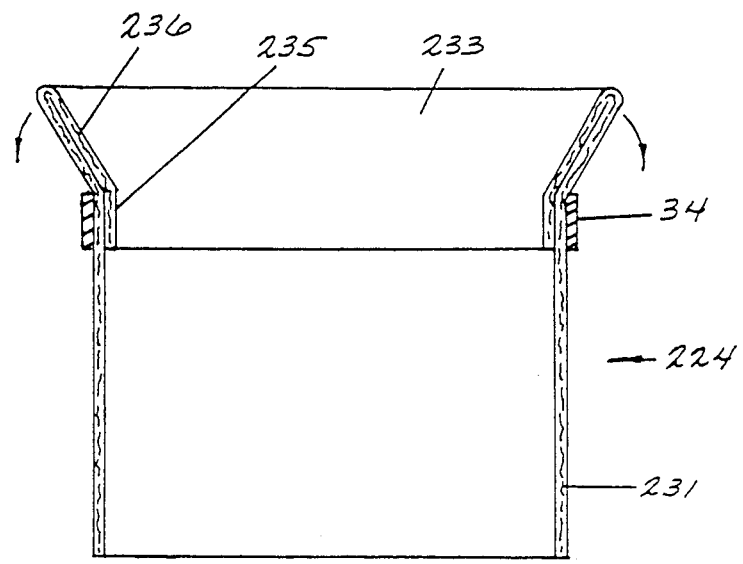
FIG. 9 is a schematic side view in cross-section, of a further embodiment of a component of the present invention; and, FIG. 10 is a schematic cross-sectional view of the water heater device showing an additional novel feature of the present invention.

FIG. 9 illustrates a further advantageous embodiment of the sleeve, generally denoted as the numeral 224. As shown, the top end of the sleeve 224 is folded back over itself to overlap the concave side of the sleeve 224, that is the side of the sleeve 224 which is in circumferential contact with the inner water tank 12, and the fold is glued thereinplace. When the sleeve 224 is positioned on the inner water tank 12, the cinch strap 34 is installed circumferentially of the sleeve 224 in the area of the overlap of the fold. The portion 236 of the sleeve fold extending above the cinch strap 34 is at least partially folded or displaced in a direction outwardly away from the tank 12 sufficiently for the bottom circumferential edge of the outer shell 14 to contact this displaced extending portion 236 and complete the folding of the extending portion 236 back over the convex outer surface of the sleeve 224 (as indicated by the arrows) as the outer shell 14 is moved downwardly coaxially over the inner tank 12 forming the annular cuff 28. As with the other embodiments described above, the portion 236 of the sleeve fold extending above the cinch strap 34 can be completely folded back over the convex surface of the sleeve 224 forming the cuff 28 before installation of the outer shell 14.

Figure 10:
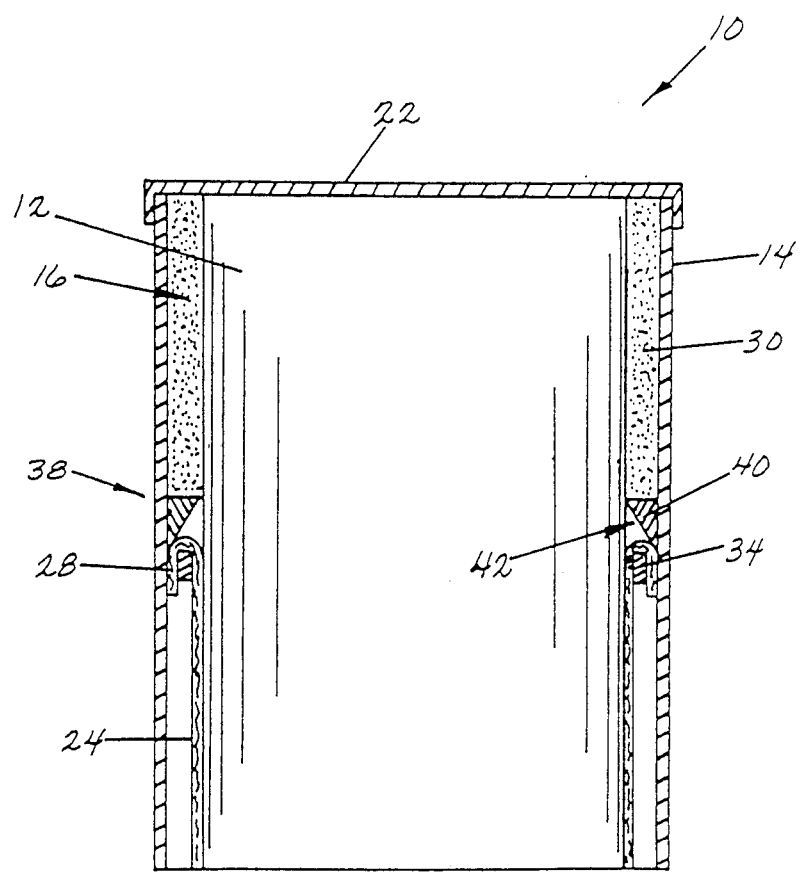

FIG. 10 illustrates the outer shell 14 including cuff compressing means, generally denoted as the numeral 38. The cuff compressing means 38 comprises a cuff contacting ring 40 affixed to the interior wall surface of the outer shell 14 at a position along the length of the outer shell 14 corresponding to the location of the cuff 28 of the sleeve 24 on the inner water tank 12 when the water heater device is assembled. The cuff contacting ring 40 includes a cuff contact surface 42 which comes into contact with the cuff 28 and further compresses the cuff 28 displacing the cuff 28 radially of the annular space against the interior wall surface of the outer shell 14 and exterior wall surface of the inner water tank 12. As shown, the cuff contact surface 42 is inclined to wedge between the cuff 28 and interior wall surface of the outer shell 14 to compress the cuff 28 between the inclined surface 42 of the cuff 28 and exterior wall surface of the inner tank 12.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

I claim:

1. A water heater comprising:
   a water tank;
   an outer shell concentrically located over the water tank defining an annular space therebetween;
   a first annular sleeve of insulation material located in the annular space extending from approximately the bottom end of the water tank upwardly longitudinally thereof a predetermined distance less than the entire height of the water tank; and
   a second annular sleeve of insulation material disposed in overlapping relation with said first annular sleeve of insulation material and folded into a cuff of double radial thickness which is disposed in overlapping relation with the top end of said first annular sleeve and compressed between said water tank and said outer shell.

2. A water heater comprising:
   a water tank;
   an outer shell concentrically located over the water tank defining an annular space therebetween;
   a first annular sleeve of insulation material located in the annular space extending from approximately the bottom end of the water tank upwardly longitudinally thereof a predetermined distance less than the entire height of the water tank;
   a second annular sleeve of insulation material adhesively attached to an overlapping portion of said first annular sleeve of insulation material;
   cinch means disposed circumferentially around said first and second annular sleeves in their region of overlap; and
   said second annular sleeve of insulation material being folded into a cuff of double radial thickness which is disposed in overlapping relation with the top end of said first annular sleeve and compressed between said water tank and said outer shell.

3. A water heater comprising:
a water tank;
an outer shell concentrically located over the water tank defining an annular space therebetween;
a first annular sleeve of insulation material located in the annular space extending from approximately the bottom end of the water tank upwardly longitudinally thereof a predetermined distance less than the entire height of the water tank;
a second annular sleeve of insulation material disposed in overlapping relation with said first annular sleeve of insulation material;
cinch means disposed circumferentially around said first and second annular sleeves in their region of overlap; and
said second annular sleeve of insulation material being folded into a cuff of double radial thickness which is disposed in overlapping relation with the top end of said first annular sleeve and compressed between said water tank and said outer shell.

4. A water heater comprising:
a water tank;
an outer shell concentrically located over the water tank defining an annular space therebetween;
a first annular sleeve of insulation material located in the annular space extending upwardly longitudinally of said water tank; and
a second annular sleeve of insulation material adhesively attached to an overlapping portion of said first annular sleeve of insulation material and folded into a cuff of double radial thickness which is disposed in overlapping relation with the top end of said first annular sleeve and compressed between said water tank and said outer shell.

5. A water heater comprising:
a water tank;
an outer shell concentrically located over the water tank defining an annular space therebetween;
a first annular sleeve of insulation material located in the annular space extending upwardly longitudinally of said water tank; and
a second annular sleeve of insulation material disposed in overlapping relation with said first annular sleeve of insulation material and folded into a cuff of double radial thickness which is disposed in overlapping relation with the top end of said first annular sleeve and compressed between said water tank and said outer shell.

6. A water heater comprising:
a water tank;
an outer shell concentrically located over the outer tank defining an annular space therebetween; and
an annular sleeve of insulation material located in the annular space extending from approximately the bottom end of the water tank upwardly longitudinally thereof a predetermined distance less than the entire height of the water tank, said annular sleeve including a plurality of folds located proximate the top end of the annular sleeve whereby a cuff of at least three sleeve thicknesses is created.

7. A water heater comprising:
a water tank;
an outer shell concentrically located over the outer water tank defining an annular space therebetween; and
an annular sleeve of insulation material located in the annular space extending upwardly longitudinally of said water tank, said annular sleeve arranged with a lower main body portion and integral therewith an upper cuff portion, said upper cuff portion including four sections separated from each other by three folds whereby said upper cuff portion is arranged with four sleeve thicknesses and compressed between said water tank and said outer shell.

8. A water heater comprising:
a water tank;
an outer shell concentrically located over said water tank defining an annular space therebetween;
an annular sleeve of insulation material located in the annular space extending upwardly longitudinally of said water tank;
an annular cuff of insulation material located proximate the top end of the annular sleeve and folded back over the convex outer surface of the sleeve, the annular cuff having a radial thickness greater than the radial thickness of the sleeve; and
cuff compressing means attached to the inner surface of the outer shell at a location generally corresponding to the position of said annular cuff for compressing the cuff inwardly against the exterior wall surface of the inner water tank.

* * * * *